US 6,652,211 B2

(12) United States Patent
Takehara et al.

(10) Patent No.: US 6,652,211 B2
(45) Date of Patent: Nov. 25, 2003

(54) BUFFER STRADDLE CRANE FOR CARGO CONTAINER HANDLING OPERATIONS

(75) Inventors: Toru Takehara, San Mateo, CA (US); Philip Alexander Tam, Emeryville, CA (US); Sun Huan Huang, Fremont, CA (US); Hans G. Vosskamp, San Mateo, CA (US)

(73) Assignee: Paceco Corp., Hayward, CA (US)

( * ) Notice: Subject to any disclaimer, the term of this patent is extended or adjusted under 35 U.S.C. 154(b) by 0 days.

(21) Appl. No.: 10/020,320

(22) Filed: Dec. 11, 2001

(65) Prior Publication Data

US 2003/0108405 A1 Jun. 12, 2003

(51) Int. Cl.⁷ .............................................. B65G 63/00
(52) U.S. Cl. .................. 414/140.3; 212/325; 414/141.3
(58) Field of Search ................ 212/324, 325, 212/326; 414/140.3, 140.4, 141.3, 141.4, 141.6

(56) References Cited

U.S. PATENT DOCUMENTS 4,293,077 A * 10/1981 Makino ....................... 212/325
5,395,200 A * 3/1995 Meier .......................... 414/281
5,515,982 A * 5/1996 Hasegawa et al. .......... 212/316

FOREIGN PATENT DOCUMENTS

WO 01/53175 * 7/2001

* cited by examiner

Primary Examiner—Thomas J. Brahan
(74) Attorney, Agent, or Firm—Bruce & McCoy; Ernest H. McCoy

(57) ABSTRACT

A buffer crane for supplementing a quay crane operation and formed to operate thereunder with a landing deck for supporting a multiple of cargo containers above dockside cargo transport operations and for moving cargo containers therebetween by means of a straddle crane mounted on rails on said landing deck.

8 Claims, 4 Drawing Sheets

BUFFER STRADDLE CRANE FOR CARGO CONTAINER HANDLING OPERATIONS

CROSS REFERENCE TO RELATED APPLICATIONS

This application is related to U.S. patent applications Ser. Nos. 10/020,321; 10/020,322; & 10/020,323 filed concurrently herewith which are included herein by reference.

BACKGROUND OF THE INVENTION

1. Field of the Invention

The present invention relates to a supplemental apparatus for cargo container handling gantry cranes and, more particularly, it relates to a device for improving the efficiency of the cycle time for dockside quay cranes. Specifically, it relates to a buffer crane which operates in conjunction with cargo container handling gantry cranes.

2. Description of the Prior Art

The utilization of various types of cargo container handling gantry cranes or quay cranes for the purpose of increasing the speed of loading and unloading of cargo container transport ships is well-established in the prior art. However, despite the numerous designs, structures, and forms disclosed by the prior art, which have been developed for the accomplishment of the specific objectives, purposes, and requirements of cargo container handling, the devices and apparatus which have heretofore been devised and utilized consist basically of familiar, expected, and obvious configurations, combinations, and arrangements of well-known machinery. This will become apparent from the following consideration of the closest known and relevant prior art.

Shipping companies wish to reduce the time a ship spends in port involved in berthing operations in order to increase the efficiency of each vessel. Increasing the productivity of berthing operations allows ships to be loaded and unloaded faster, thereby effectively reducing the ship's down time. Efforts are continuously being made to further this objective. The present invention is a significant advancement in these efforts.

Reference is made to FIG. 1 of the drawings which shows a typical dockside berthing operation for a ship. The primary container handling equipment is comprised of one or more quay cranes 11 which extend outboard from the dock's edge 13 across the beam of a ship 15. Cargo containers 17 which have been unloaded or are to be loaded are temporarily stored in a stacking yard 19 proximate to the ship's loading berths. The berthing operations under specific consideration involve the transport of containers between a container ship and the stacking yard.

In ship unloading operations, quay cranes 11 access the shipboard cargo containers from above the ship and move them to the ground level or dockside cargo container transporters 21 such as chassis trucks, trailer trucks, or automatically guided vehicles (AGVs). The transporters deliver the containers to the stacking yard 19 where other vehicles or cranes 23 transfer the containers to stacks. In loading operations, quay cranes lift the cargo containers from the dockside container transporters and move them to the ship where they are lowered into shipboard cells. The berthing operations involve three separate types of sub-operations: (1) quay crane handling; (2) transport between the crane and the stacking yard; and (3) storage yard manipulation.

Quay cranes in the form of cargo container handling gantry cranes are arranged to extend over a longitudinal expanse and transfer cargo containers horizontally from one deposition area to another. The largest of such gantry cranes are primarily located dockside in shipping ports around the world as well as in railroad yards. Quay cranes generally have either a horizontal sliding boom or a cantilever boom, the latter of which can usually be raised by rotating it around its inboard end. Long span yard and quay cranes are typically supported by vertical structures located inboard from the ends of the crane gantry on rail mounted wheels. The present invention can be utilized with any of these basic types of crane designs and operations.

Reference is made to FIG. 2 of the drawings which illustrate a typical cantilever boom type quay crane 11 having a buffer crane 25 of the present invention positioned thereunder. The quay crane cantilevered rotatable boom 27 is supported by the crane superstructure 29 mounted on crane truck wheels 31 which run on dock rails which are disposed parallel to the edge 13 of the harbor dock. The crane superstructure supports a horizontal gantry 33 disposed generally mid-height thereon at an elevated location above the cargo container pickup and deposition areas 35. The gantry is supported from below by the main legs of the superstructure.

In the cantilevered rotatable boom design for quay cranes, sheaves are disposed at the pinnacle 37 of the superstructure of the crane to guide wire rope reeving 39 which is used to lift the outboard or cantilevered end of the boom to the upright raised stowed position. The wire rope reeving raises the cantilevered boom by rotating it about its hinge point 43 at its inboard end proximate to the superstructure.

While, in most typical dockside applications, the gantry of a cargo container handling quay crane is a slidable or a raisable cantilevered boom extending from a crane superstructure to project over a ship, other types of large gantry yard cranes supported at both ends are located in large cargo container storage or transfer areas. All of these cranes are similar to the gantry type crane of FIG. 2 in that they employ a movable trolley 45, usually with a suspended operator's cab 47, which shuffles along the gantry 33 and boom 27 suspending a cargo container lifting spreader 49. The spreader can be raised or lowered from the crane gantry by the operator and engages from above the top of cargo containers 17. The containers are carried by a transporter 21 or are stacked on the dock or shipboard to permit them to be lifted by the trolley for horizontal transport. During loading, the containers are lifted from the transporter and are moved outboard along the gantry to where they are lowered into the cells 51 in a cargo container transport ship. During unloading, the containers are lifted from the cells and moved from shipboard to shore where they are lowered onto the transporters.

The cargo container lift trolley 45, mounted on rails on the crane gantry sections 27, 33, can traverse from one end of the gantry to the other with a suspended container. The cargo container lifting spreader 49 is suspended from the trolley by fleet through wire rope reeving through a detachable headblock which carries the wire rope suspension sheaves. Different or variable length spreaders can be secured to the headblock to accommodate correspondingly different size containers.

There are two highly interdependent berthing sub-operations: (1) quay crane handling; and (2) transport vehicle movements between the crane and the stacking yard. A delay in one of those sub-operations causes the other to pause and idle which reduces the overall productivity of the entire system. Several factors can cause delays in the two berthing sub-operations including: (1) unsteady or irregular quay crane operations; (2) the time required for effecting interbox connector (IBC) installation and removal processes; (3) delays in stacking yard operations that delay throughput of transport vehicles; (4) the time required for quay cranes performing alignment of containers with transport chassis; (5) congestion of transport vehicles under quay cranes; and (6) various other factors such as machinery operator mistakes or inexperience.

Quay crane container handling rates are measured in cycle rates. Unsteady quay crane operations result because the cranes move containers different distances depending upon the location of the container on a ship varying the cycle rates. For example, as a quay crane loads or unloads each column of containers spaced across the beam of the ship, the hoist travels a longer distance outboard for each successive column of containers and lowers and hoists longer for each container located deeper in the stack. The increased traveling distance and stationary time for the hoist, for each successive container, adds to the container handling time and the resulting cycle time.

Unsteady quay crane operation, coupled with a constant number of transport vehicles allotted per crane, creates inefficiencies in the overall operation. When quay crane handling rates or cycle time are slow, transport vehicles must wait. In those instances where the quay crane handles containers fast and cycle time is short, and if the number of transport vehicles is insufficient for the cycle time, the quay crane must wait.

The interbox connector (IBC) installation and removal processes cause both quay cranes and transport vehicles to idle. IBCs are cone-shaped devices that lock stacked containers together on the ship. When quay cranes lift containers from the ship, the IBCs are still attached to the bottom of the container. Usually, the quay cranes must lower the container until it is a few feet above the port terminal dock level where a worker crew can reach underneath and remove the IBCs. The installation processes are just the reverse. The IBC operations cause a significant amount of quay crane and transport vehicle idle time to be induced into the system cycle time as well as exposing the workers to the possibility of injury from a swaying or dropped container or any other hazards associated with proximity to a lifted load and to continuous transport vehicle operations.

Delays in stacking yard operations also cause delays in the throughput of container transport vehicles. The vehicles load or unload containers at the stacking yard before returning to the cranes. Disruptions in the flow of transport vehicles to and from the quay crane loading area are caused by numerous factors such as driver inexperience and lack of familiarity with the apparatus and layout of the yard, as well as yard worker inexperience, which cause the delays in the stacking yard operations. If the disruptions are sufficiently severe, then the quay cranes must wait in idle for a transport vehicle to return.

Another source of delay results when quay cranes expend time aligning a suspended container with a container transport chassis during the container positioning and deposition process. The transport vehicles do not park in precise locations under the quay cranes. As a result, each container placement is in a slightly different location. This process of container lifting spreader alignment with the transport vehicle causes time-consuming delay in the quay cranes operation.

Finally, congestion of transport vehicles under the quay crane slows the rate at which containers are moved to and from the container ship. The situation is exacerbated when there are several cranes working in parallel and the ship carries refrigerated containers. The orientation of the refrigerated containers on the ship often requires that vehicle traffic flow two ways under the quay cranes in order to properly orient the containers on the transport chassis whereas unidirectional flow would create less congestion and danger to the dock workers.

The buffer crane operations contemplated according to the present invention departs substantially from the conventional concepts, designs, and modes of quay crane operation taught by the prior art. In doing so, the present invention provides an apparatus and new method of sub-operation primarily developed for the purpose of improving the overall efficiency of berthing operations by reducing or eliminating the delay problems described above. It accomplishes the result in a different and improved manner and an overall new method of operation for the dockside handling of cargo containers.

The buffer crane of the present invention functions mainly by establishing a temporary storage or holding operation between the quay cranes and the transport vehicles which reduces the interdependence therebetween. The buffer operation in effect constitutes a container reservoir between two of the three berthing sub-operations: quay crane handling and transport between the crane and the stacking yards. The temporary storage reservoir permits the quay crane to take or deposit containers even if no transporter is available, or conversely, for a transporter to extract a container, or deposit one in the reservoir. When one of the two sub-operations experiences a delay, the other sub-operation continues to work with the buffer operation while the delayed sub-operation resolves its problem.

SUMMARY OF THE INVENTION

In view of the foregoing known and obvious disadvantages inherent in the prior art types of quay cranes and berthing operations presently existing and utilized in seaports, the present invention provides a new crane construction and method of quay crane operation wherein the same can be utilized to improve the efficiency of cargo container ship berthing operations.

The general purpose of the present invention, which will be described hereafter in greater detail, is to provide a new crane apparatus and function which has all of the advantages of the prior art mentioned above, as well as many novel features that result in new methods of berthing operations, which are not anticipated, rendered obvious, suggested, or even implied by any of the prior art of quay cranes and port berthing operations either alone or in any combination thereof.

The present invention is a buffer straddle crane for cargo container handling. It is comprised of an elevated platform forming a landing deck where containers can be landed and temporarily stored by a quay crane when they are removed from shipboard or where containers picked off ground level transporters can be landed until they are picked up by the quay crane for transport to a ship. The platform has an opening in the landing deck where containers can be lowered and raised therethrough. The buffer crane platform is supported by motorized transport wheels for independent all-direction movement. It has a low profile whereby it can be positioned underneath the quay crane to receive cargo containers therefrom as well as from container transporters. The quay crane can extract containers therefrom and the buffer crane can deliver containers therefrom to the container transporters. The platform supports a cargo container handling straddle crane mounted on rails disposed on the fore and aft edges of the platform and has cargo container lifting apparatus arranged to transfer containers between the landing deck and cargo container transporters parked or located underneath the platform through the opening in the landing deck.

These more important features of the invention have been broadly outlined in order that the detailed description thereof which follows may be better understood and in order that the present contribution to an improvement in the art may be better appreciated. There are additional features of the invention that will be described hereinafter and which will form supplemental subject matter of the claims appended hereto.

With respect to the claims hereof, and before describing at least one preferred embodiment of the invention in detail, it is to be understood that the invention is not to be limited in its application to the details of construction and to the arrangements of the components which are set forth in the following description or illustrated in the drawings. The invention is capable of being created in other embodiments and of being practiced and carried out in various ways. Also, it is to be understood that the phraseology and terminology employed here are for the purpose of description and should not be regarded as limiting.

As such, those skilled in the art will appreciate that the conception upon which this disclosure is based may readily be utilized as a basis for the designing of other forms, structures, methods, and systems for carrying out the several purposes of the present invention. It is important, therefore, that the claims be regarded as including such equivalent constructions in so far as they do not depart from the spirit and scope of the present invention.

Further, the purpose of the appended abstract is to enable the United States Patent and Trademark Office, and the public generally, and especially scientists, engineers and practitioners of the art who are not familiar with the patent and legal terms or phraseology, to determine quickly from cursory inspection the nature and essence of the technical disclosure of the application. The abstract is neither intended to define the invention of the specification, which is measured by the claims, nor is it intended to be limiting as to the scope of the invention in any way.

OBJECTS OF THE INVENTION

It is therefore an important object of the present invention to provide a new sub-operation for shipping port berthing operations which provides a buffer between quay crane operations and the container transport vehicles which service a stacking yard.

It is another object of the present invention to provide a buffer operation for quay crane berthing operations which provides an intermediary landing deck forming a cargo container reservoir between quay crane handling and dockside vehicle transport.

It is a further object of the present invention to provide a buffer crane to work in conjunction with a quay crane to increase the efficiency of berthing operations by reducing idle time of the quay crane and container transport vehicles.

It is still another object of the present invention to provide a gantry frame having a protected service deck for port operators to perform IBC installation and removal operations while the containers are landed on the buffer crane whereby neither the quay crane nor the container transporters need to idle during those operations.

And it is yet a further object of the present invention to provide a supplemental independently movable gantry crane which can be supplied to presently existing quay cranes without additional tracks on the dockside and which provides a landing deck for containers and performs a supplemental buffer sub-operation to quay crane operations and permits IBC removal independent of quay crane involvement to increase the efficiency of berthing operations by reducing the quay crane cargo container handling cycle times.

Other objects and advantages of the present invention will become apparent when the method and apparatus of the present invention are considered in conjunction with the accompanying drawings.

DESCRIPTION OF THE PREFERRED EMBODIMENT

Reference is made to the drawings for a description of the preferred embodiment of the present invention wherein like reference numbers represent like elements on corresponding views.

Figure 1:
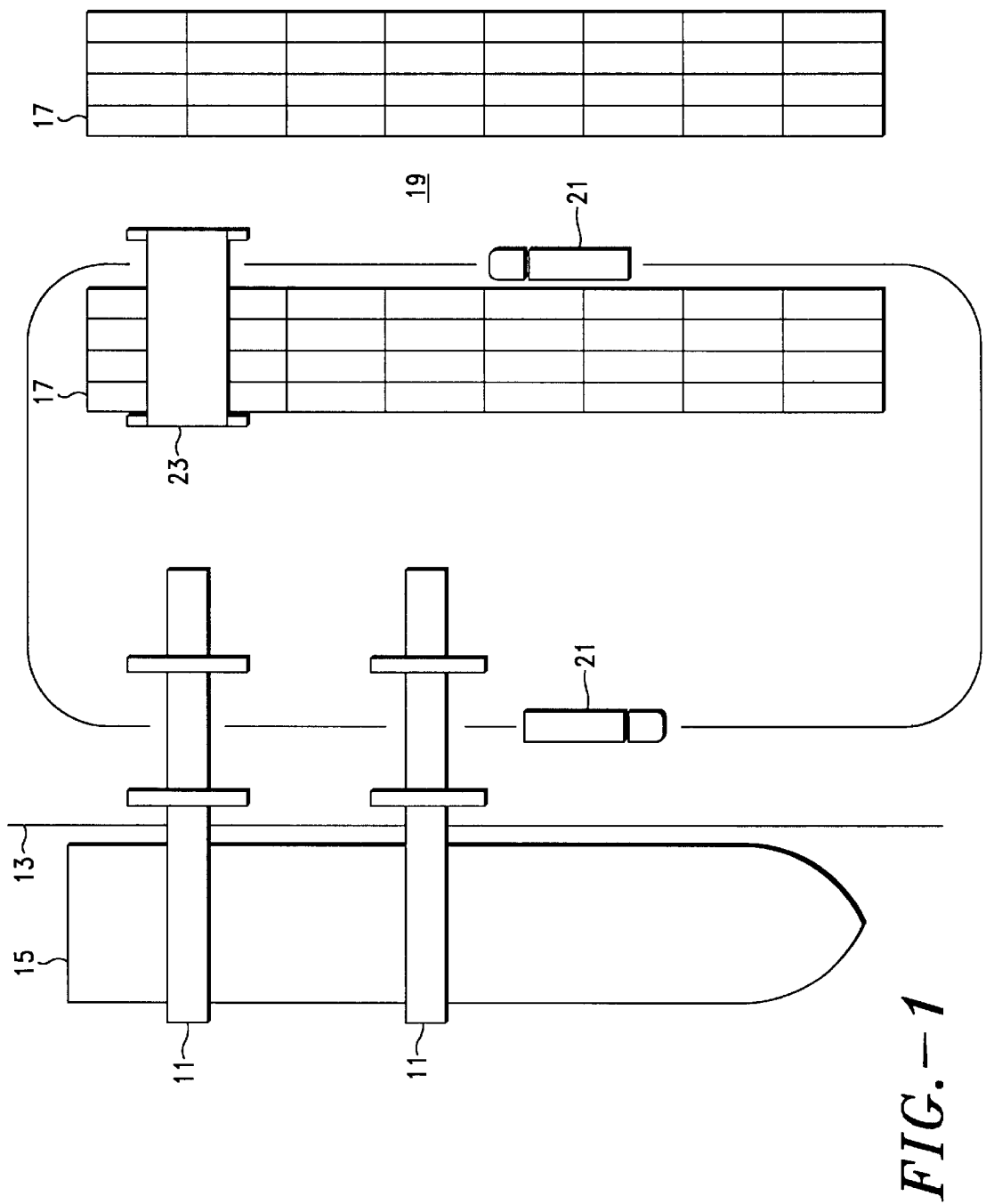
FIG. 1 is a schematic diagram in plan view of a ship berthing operation and a cargo container stacking yard.
Figure 2:
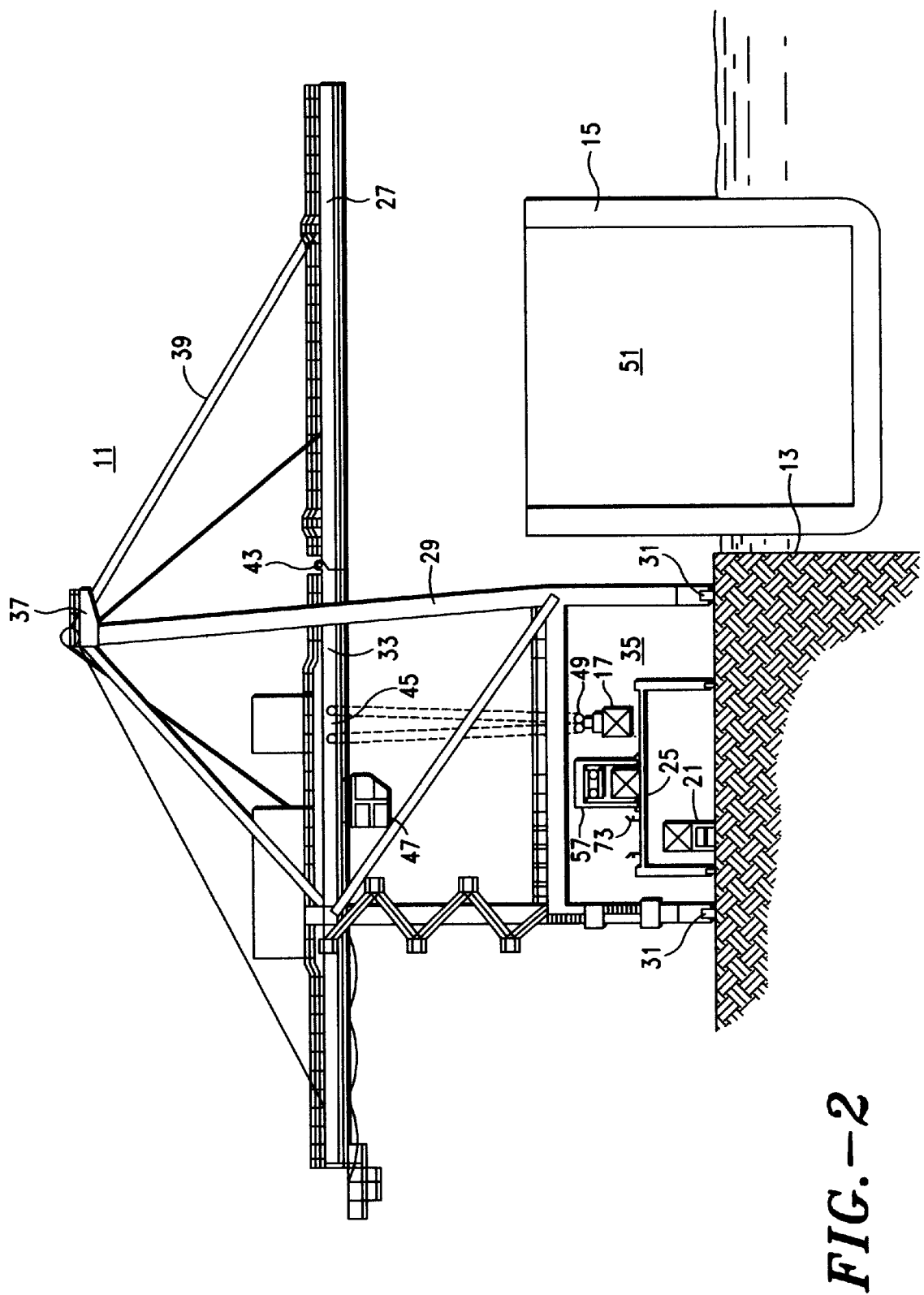
FIG. 2 is a side elevation of a typical quay crane with a buffer straddle crane of the present invention located thereunder.
Figure 3:
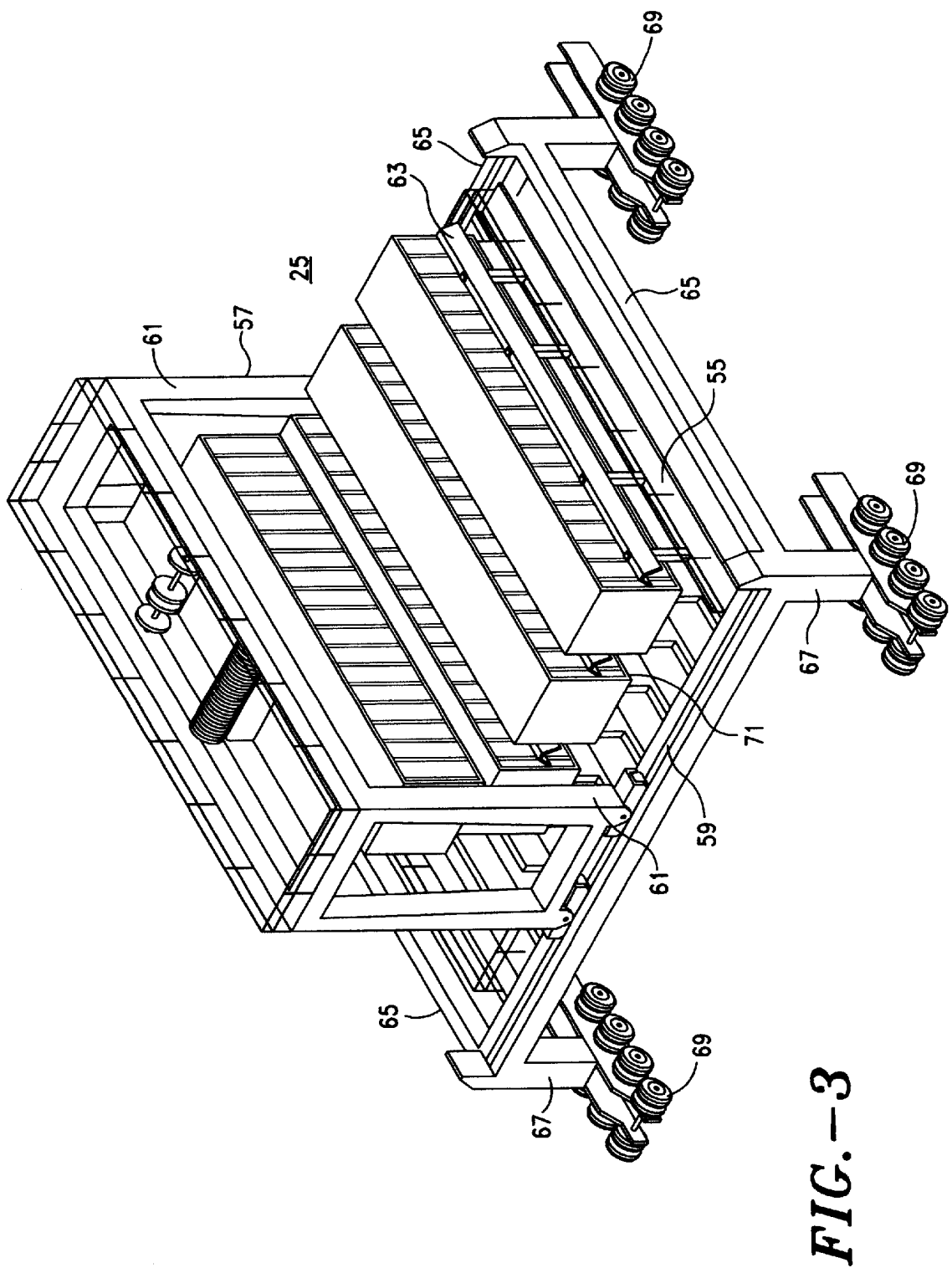
FIG. 3 is a perspective view of a buffer straddle crane of the present invention shown in operation.

Reference is made to FIGS. 2 and 3 of the drawings which show the quay crane 11 and a buffer straddle crane 25 which are located dockside in a shipping port. The buffer crane is low profile so that it can be positioned underneath a quay crane during container handling operations. It is contemplated that a buffer crane could also be utilized in a railroad stacking yard as well as dockside under a large bridge or straddle crane, so the term "quay crane" as used in the claims is intended to include these types of cranes also.

FIG. 3 shows the buffer straddle crane in operation. It is essentially a landing deck where containers can be landed by a quay crane when they are removed from shipboard and temporarily stored or where containers picked off ground level transporters can be landed until they are picked up by the quay crane for transport to a ship. The buffer straddle crane is a gantry frame forming a raised or elevated upper platform 53 with a multiple of subplatforms 55. The buffer crane sits under a quay crane and interposes a container reservoir between the quay crane and the container transport vehicles. The quay crane can take or extract containers therefrom and the buffer crane can deliver containers therefrom to the transporters. It creates a new and additional sub-operation in ship berthing operations which reduces quay crane cycle time in cargo container handling.

The quay crane 11 deposits or retrieves containers 17 onto or from the upper platform of the buffer crane called the landing deck 53. The subplatforms 55 disposed slightly below the landing deck are working areas for port operators called service decks. The landing deck can support multiple containers to function as the container reservoir or pool in the buffer operation. Container transport vehicles 21, such as chassis trucks, trailer trucks, or AGVs, drive under or below the raised platform to either deliver or receive containers to and from the buffer crane landing deck.

A dedicated cargo container handling crane in the form of an overhead rail mounted straddle crane 57 disposed above the landing deck 53 moves the containers 17 between the transport vehicles 21 and the landing deck. The straddle crane is mounted on rails 59 on the landing deck and supports cargo container handling apparatus above the landing deck by legs 61 disposed at the fore and aft edges thereof. The straddle crane drops containers onto and retrieves them from dockside container transporters through one or more openings in the landing deck.

Port operators can also perform certain tasks on the containers from the safety of the service decks 55 while the containers rest on the landing deck 53. The service decks are provided with rigid shelters 63 to protect service workers from descending containers and inclement weather. With current methods of operation, both the quay cranes and transport vehicles must sit idle while the IBCs are installed or removed. The buffer crane system allows port operators to perform IBC installation and removal operations while the containers rest in the buffer pool on the landing deck so that neither the quay crane nor the container transport systems need to idle during the IBC attachment or removal process. In addition, service personnel can verify container identification, re-mark a container, or perform minor container servicing while it resides on the landing deck.

The upper platform or landing deck 53 has fore and aft and lateral edges 65. In the preferred embodiment of the present invention, the landing deck 53 is supported at the corners thereof by four vertical support columns or legs 67. The platforms are supported on pneumatic transport wheels 69 for independent movement of the buffer crane 25. The rigid structure provides structural support for the loads from the straddle crane 57, for the buffer containers 17 deposited on the landing deck 53, and for emergency impact situations and accidental occurrences. Shock absorbing mechanisms diminish the force of the continuous impacts which result from the container landing operations as well as impacts which occur in emergency situations. The inflated rubber tires augment the shock absorbing mechanisms.

The transport wheels 69 are secured to the legs 67 with a gantry drive for independent movement of the buffer crane 25 underneath the quay crane 11 and along dockside 13. The crane is mounted on tires so that it can operate without tracks or rails and can turn. Since the quay cranes move along the dock as they unload each successive row of container cells along the length of the ship, the buffer crane must likewise move along the dock to remain positioned under the quay crane. The buffer crane gantry drive is the arrangement of wheels, gear systems, drive motors, and brakes that allow the entire buffer crane system to move. By varying the speed of the tires, the crane can move in all directions and is omni-directional. A majority of the time, the wheels are aligned parallel to the edge of the dock which allows the gantry frame of the buffer crane to move in the same direction as the quay crane. In order to stay parallel with the quay crane, the buffer crane performs small turns by varying the wheel speeds on each side the crane.

As indicated earlier, the landing deck 53 of the buffer crane stores containers 17 temporarily as a container reservoir or pool thereby functioning as the essential buffer platform. The landing deck is provided with at least one predetermined landing position formed on the landing deck and has support members 71 formed to receive and support containers which are lowered onto the landing position. In the preferred embodiment of the invention, a multiple of predetermined landing positions are dispersed over the landing deck, each with its set of support members. The term "predetermined" means that they are specifically located for automatic control of the crane operation. Generally between two and five parallel landing positions will suffice for the intended purpose of providing a container reservoir or pool.

Access to the containers 17 or the landing deck 53 is provided by the rail mounted straddle crane 57 as well as by the quay crane 11 from above. The straddle crane has container lifting apparatus 83 arranged to move containers between the landing deck and the transporters located underneath the platform through one or more openings in the landing deck.

Figure 4:
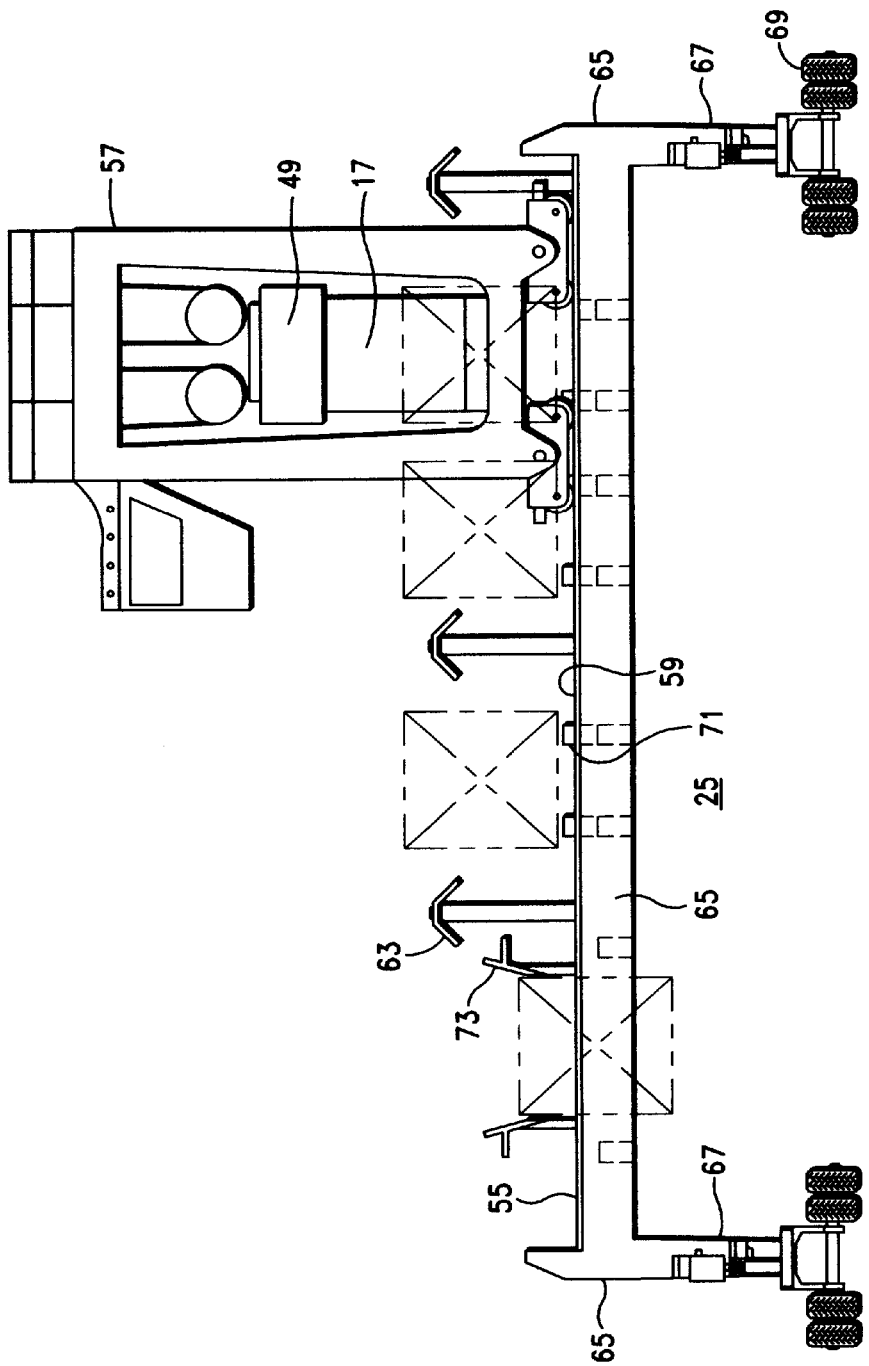
FIG. 4 is a front elevation view of FIG. 3.

The landing deck is provided with at least one opening through which containers can be lowered or raised onto or from transporters which have been driven and positioned under the buffer crane. Reference is made to FIG. 4 of the drawings. Guides 73 forming a chute are positioned on the sides of the opening to stop the sway of a suspended container being lowered therethrough. Similar guides can be positioned on the lower side of the landing deck for the related purpose: to stop the sway of a load being raised therethrough.

Each container landing position can be located over an opening through which containers may be raised or lowered by making the support members 71 retractable laterally when a container is raised therefrom to allow the container to be dropped or raised through the opening in the landing deck. Retractable guides 73 can be moved into position concurrently or sequentially to stop any sway in the suspended container prior to deposition onto a landing position.

The landing deck 53 is wide enough to accommodate several containers 17 in the predetermined landing positions. Access to the bottom of the containers deposited on the landing deck is provided by the service decks 55 on the landing deck disposed on both sides of the predetermined positions. When the containers are mounted on the support members 71, the sides and corners of the containers are exposed adjacent to the service decks. Equipment may be mounted on the service decks depending upon whether the IBC installation and removal operations are manual or automated. The service deck shelters protect service personnel who work partially below the landing deck from exposure to injury as well as the sun and rain.

Similar sway arrest guides to those used around openings in the landing deck may be used to vertically guide the containers into place during landing on the deck to simplify and expedite the placement of the containers thereon. During lowering of the containers onto the landing deck support members 71, the bottom edges of the containers engage the guides which stop residual container sway of the suspended load and laterally displace the container into proper alignment onto the respective deposition position. The descending container slides downward along the guides in the vertical direction. Therefore, the container landing process requires less precision than current methods utilized with container transport vehicles. This saves considerable time by reducing container positioning requirements. It also reduces the work demand on the quay crane operators who currently endure fatiguing conditions. Essentially, much less time is spent on the placement of a container because the quay cranes do not need to perform tedious positioning adjustments. The guides also place the containers in specific locations so that the straddle crane may accurately move to the predetermined deposition and pick-up positions above the landing deck by automated control.

The rail mounted straddle crane 57 is shown in closer detail in FIGS. 3 and 4. It has fore and aft legs 61 supporting a bridge 75 which suspends the container lifting apparatus above the landing deck 53. The lower ends of the legs are mounted on motor driven wheel carriages 77 engaged with the platform rails 59 for reciprocating lateral motion of the bridge along the width of the landing deck. The bridge spans the length of the landing deck and the openings therein whereby containers can be moved laterally along the landing deck to and from all of the openings therein. By this means, containers can be transferred through the landing deck between it and the container transporters parked underneath the buffer crane.

The straddle crane has support legs long enough to permit the cargo container lifting apparatus suspended under the bridge, with a container suspended therefrom, to pass above cargo containers deposited on the buffer platform but with the top of the straddle crane disposed at a level below the supporting structure of any cargo container quay crane it is positioned under. Alternatively, if the vertical clearance is limited, each container deposition position is provided with an opening to allow containers to be dropped through the landing deck whereby the legs can be shortened.

The cargo container lifting apparatus operates by reeling in and paying out rope from the suspension block that suspends the lifting spreader 49 whereby the apparatus is considered rope driven. The lifting spreaders are mechanisms that engage and hold containers while they are being lifted. Each corner of the spreader has a twist lock to lock onto the container at the corner castings thereof. The lifting spreader can be controlled by the crane operator to reciprocate in the length of its engagement to a container to accommodate different size containers in the lengths of 20 feet, 40 feet, 45 feet, and two containers of 20 feet each, linked end-to-end.

The cargo container lifting apparatus also has the ability to perform incremental adjustments of the container's position to facilitate alignment with the transport vehicles 21. The apparatus accomplishes this result by giving and taking varying amounts of slack in the suspension ropes. In this manner, the apparatus can skew, list, and trim the container, as well as move the container laterally and longitudinally. The lifting apparatus therefore can quickly position containers on transport vehicles thereby eliminating the time-consuming task from the quay crane's cycle time.

The buffer crane 25 includes an automated control system for partial operation of the straddle crane 57 to position the cargo container lifting apparatus over preselected positions on the landing deck 53 and to move containers 17 with coordinated motion to reduce sway in the suspended load. The straddle crane moves automatically between predetermined positions above the landing deck to general positions above the various transport vehicles 21. The crane operator only needs to select from the alternative predetermined container deposition positions on the landing deck to perform container engagement and pickup from a position and for container deposition at a selected position. Computer control performs precision alignment of the cargo containers with respect to the landing deck positions and general positioning of the container lifting spreader above the container transporters. The buffer crane operator controls the straddle crane for accurate alignment of the lifting spreader with the transport vehicle for container pickup or deposition. Computer software automatically controls the acceleration and movement of the straddle crane along the platform rails to insure that the movement is smooth and linear during both operator and automatic control of the crane drive and lift mechanisms.

As mentioned earlier, with current methods of operation, both the quay cranes and transport vehicles must sit idle while the IBCs are installed or removed. The quay cranes 11 must pause and hold the containers 17 a few feet off the ground so that personnel can manually install or remove the IBCs. The proximity of the personnel to the lifted container is also a safety hazard. The service decks 55 of the present invention are provided alongside the container landing positions on the landing deck 53. The situation may require a multiple of lowered service decks disposed between the container deposition positions on the landing deck for the service workers to operate from.

The service decks or work platforms 55 are disposed at a level below the landing deck 53 surface to provide space for IBC attachment and removal operation. The design arrangement permits service workers to work standing up rather than intermittently or constantly bending over. Because the height limitations for the straddle crane design are restricted, and because of the possible need to lower containers through each predetermined landing position, the service deck cannot in every case be located directly below the landing deck.

The service decks are in essence covered steel trenches, between the landing positions, from which the service workers can access the interbox connectors when a container is disposed on the support members 71 of an adjacent landing position. As a result, the workers are never put in a situation where lifted loads are freely suspended overhead, because of the shelters 63, as can occur in present operations, which is an inherently dangerous situation.

In the buffer crane system of the present invention, the service deck provision allows the safe and efficient installation and removal of the IBCs. It provides port operators with a work area within which to remove the IBCs from the cargo containers deposited on the landing deck either by hand or with IBC removal machinery. Machines or robotics can be provided to aid IBC installation and removal operations for further reducing the strain and danger for worker personnel and increasing the speed of quay crane operations. As a result, the quay cranes and transport vehicles do not need to idle or wait while the IBC installation or removal process occurs.

The buffer crane operator driver works in an operators' cabin 85. It contains all of the automotive and the straddle crane 57 controls. Logistics are included to help the operator communicate with the quay crane operator and the service deck workers. Since the operator must communicate with so many individuals, it is essential that communication be clear and simplified to insure safety and productivity. Signal lights on the landing deck automatically indicate to the quay crane driver which containers are to be loaded onto the ship or have already been unloaded. There are indicator lights controlled by the service workers which tell the buffer crane operator whether the IBCs have been removed or not so that the operator does not prematurely move the container. The operator cabin provides simplified controls for the crane driver by reason of the computer controlled positioning of the straddle crane at the predetermined deposition positions on the landing deck.

A diesel engine which is coupled to an alternator provides power to the buffer crane system, or it may be provided by electric cables. Weather protected steel enclosures protect the diesel engine and alternator couple from wear and possible damage.

During operation of the buffer crane, an electronic system automatically aligns the buffer crane with the quay crane along the cargo container transporter traffic lanes. The system can be comprised of optical, radio, or ultrasonic devices to measure the distance and relative position of the buffer crane to the quay crane. Information is linked to the quay drive system electronically which repositions the buffer crane until it is in the correct position directly below the quay crane trolley track and parallel to the quay crane quay wheels.

Another electronic system insures that there is no interference or collision between the quay crane spreaders. With two devices accessing the landing deck, the quay crane and straddle crane, there is potential for interference and collision. The electronic system will identify the position of the quay crane lifting spreader to ensure that this does not occur.

The buffer crane system has features that improve productivity and safety of port operations. The buffer crane is a stand-alone machine. It can operate with any existing quay cranes. The quay cranes require only minimal modification to accommodate the electronic linking systems. There are no costs involved which would be due to required extensive crane modifications or crane downtime. Because the buffer crane travels on rubber tires, the buffer operation does not require tracks, so there is no need to install additional rails on the port surface. The buffer crane has the advantage that is easy and inexpensive to install and can be applied to many cargo container handling ports in operation today.

The buffer crane therefore resolves many of the delay issues described earlier. Even when one of the sub-operations of quay crane handling or container dockside transport is delayed, the other sub-operation may continue by accessing the containers on the buffer platform. The delayed sub operation can address the delay, and the other crane continue its work. The complete elimination of IBC installation and removal operations from the quay crane cycle time provides a huge improvement in the efficiency of berting operations.

In summary, the buffer crane system improves productivity and efficiency of port operations by providing a buffer operation between the quay cranes and transport vehicles sub-operations. This buffer allows quay cranes and vehicles to operate independently so that delays in one sub operation do not slow the overall productivity. Additionally, the buffer allows port operators to perform tasks on containers such as marking and inspection while they sit on the buffer platform rather than having the quay cranes and transport vehicles wait while those operations are performed.

Thus, it will be apparent from the foregoing description of the invention in its preferred form that it will fulfill all the objects and advantages attributable thereto. While it is illustrated and described in considerable detail herein, the invention is not to be limited to such details as have been set forth except as may be necessitated by the appended claims.

We claim:

1. A buffer straddle crane for cargo container handling comprising an elevated platform forming a landing deck where a multiple of containers can be landed on predetermined landing positions and temporarily stored by a quay crane when they are removed from shipboard or where containers picked off ground level transporters can be landed until they are picked up by the quay crane for transport to a ship, said platform having at least one opening in said landing deck where containers can be lowered and raised therethrough, said platform being supported by motorized transport wheels for independent all-direction movement, said buffer crane having a low profile whereby it can be positioned underneath said quay crane to receive cargo containers therefrom as well as from said container transporters and whereby said quay crane can extract containers therefrom and said buffer crane can deliver containers therefrom to said transporters, and a cargo container handling straddle crane mounted on rails disposed on the fore and aft edges of said platform and having container lifting apparatus arranged to transfer containers between said various predetermined landing positions on said landing deck and said transporters located underneath said platform through said opening in said landing deck.

2. The buffer crane of claim 1 wherein said straddle crane has fore and aft legs supporting a bridge which suspends said container lifting apparatus above said landing deck, the lower ends of said legs being mounted on motor driven wheel carriages engaged with said platform rails for reciprocating lateral motion of said bridge over the width of said landing deck and said opening in said platform, said bridge spanning the length of said landing deck whereby containers can be moved laterally along said landing deck to and from said opening therein whereby containers can be transferred therethrough between container transporters parked underneath said buffer crane and said landing deck.

3. The buffer crane of claim 2 wherein said straddle crane and said cargo container lifting apparatus with a container suspended therefrom are arranged on said platform at a level to pass above cargo containers deposited on said landing deck and remain below the supporting structure of any cargo container quay crane said straddle crane is positioned under.

4. The buffer crane of claim 1 including a multiplicity of predetermined parallel container deposition positions located on said landing deck.

5. The buffer crane of claim 4 including at least one service platform disposed proximate to said landing deck to permit workers to install and remove interbox connectors from cargo containers deposited on said deposition positions located on said landing deck.

6. The buffer crane of claim 5 including service platforms disposed on both sides of each of said deposition positions located on said landing deck to permit service workers to install or remove interbox connectors secured to corners of cargo containers deposited on said landing positions from the sides thereof.

7. The buffer crane of claim 4 including an automated control system for partial operation of said straddle crane to position said cargo container lifting apparatus over said preselected positions on said landing deck and to move containers with coordinated motion.

8. A buffer straddle crane for cargo container handling comprising an elevated platform forming a landing deck having a multiplicity of predetermined parallel container landing positions located thereon where containers can be landed and temporarily stored by a quay crane when they are removed from shipboard or where containers picked off ground level transporters can be landed until they are picked up by the quay crane for transport to a ship, said platform having at least one opening in said landing deck where containers can be lowered and raised therethrough, said platform being supported by motorized transport wheels for independent all-direction movement, said buffer crane having a low profile whereby it can be positioned underneath said quay crane to receive cargo containers therefrom as well as from said container transporters and whereby said quay crane can extract containers therefrom and said buffer crane can deliver containers therefrom to said transporters, a straddle crane having fore and aft legs supporting a bridge which suspends container lifting apparatus above said landing deck, the lower ends of said legs being mounted on motor driven wheel carriages engaged with said platform rails for reciprocating lateral motion of said bridge over the width of said landing deck and said opening in said platform, said bridge spanning the length of said landing deck whereby containers can be moved laterally along said landing deck to and from said opening therein whereby containers can be transferred therethrough between container transporters parked underneath said buffer crane and said predetermined landing positions on said landing deck, said straddle crane and said cargo container lifting apparatus with a container suspended therefrom being arranged on said platform at a level to pass above cargo containers deposited on said landing deck and remain below the supporting structure of any cargo container quay crane it is positioned under, a multiplicity of predetermined parallel container deposition positions located on said landing deck, service platforms disposed on both sides of each of said deposition positions located on said landing deck to permit service workers to install or remove interbox connectors secured to corners of cargo containers deposited on said landing positions from the sides thereof, an automated control system for at least partial operation of said straddle crane to position said cargo container lifting apparatus over preselected positions on said landing deck and to move containers with coordinated motion, and guides for arresting sway of containers being lowered through said opening in said landing deck.

* * * * *